US012638712B2

(12) United States Patent
    Rho et al.

(10) Patent No.: US 12,638,712 B2
(45) Date of Patent: May 26, 2026

(54) MULTI-FOCUSING META LENS

(71) Applicants: POSCO HOLDINGS INC., Seoul (KR); RESEARCH INSTITUTE OF INDUSTRIAL SCIENCE & TECHNOLOGY, Pohang-si (KR); POSTECH RESEARCH AND BUSINESS DEVELOPMENT FOUNDATION, Pohang-si (KR)

(72) Inventors: Jun Suk Rho, Pohang-si (KR); Ye Seul Kim, Pohang-si (KR); Joo Hoon Kim, Pohang-si (KR)

(73) Assignees: POSCO Holdings Inc., Seoul (KR); Research Institute of Industrial Science & Technology, Pohang-si (KR); POSTECH Research and Business Development Foundation, Pohang-si (KR)

( * ) Notice: Subject to any disclaimer, the term of this patent is extended or adjusted under 35 U.S.C. 154(b) by 226 days.

(21) Appl. No.: 18/223,428

(22) Filed: Jul. 18, 2023

(65) Prior Publication Data

US 2024/0027823 A1    Jan. 25, 2024

(30) Foreign Application Priority Data

Jul. 19, 2022    (KR) ........................ 10-2022-0088993

(51) Int. Cl.
    *G02F 1/1335*        (2006.01)
    *G02B 1/00*         (2006.01)
(52) U.S. Cl.
    CPC ....... *G02F 1/133526* (2013.01); *G02B 1/002* (2013.01)

(58) Field of Classification Search
    CPC ........ G02B 5/008; G02B 1/002; G02B 1/007; G02B 26/06; G02B 1/005; G02B 5/1809; G02F 1/292; G02F 2202/30
    See application file for complete search history.

(56) References Cited

U.S. PATENT DOCUMENTS

| | | | |
|---|---|---|---|
| 11,061,179 B2 | 7/2021 | Hu | |
| 2019/0196267 A1 | 6/2019 | Yoo et al. | |
| 2020/0272100 A1* | 8/2020 | Yu ........................ | G03H 1/0244 |
| 2020/0344430 A1* | 10/2020 | Wang .................. | H04N 25/571 |
| 2021/0262116 A1* | 8/2021 | Rao ....................... | G02B 5/3083 |
| 2022/0086419 A1* | 3/2022 | Qaderi .................. | H04N 13/30 |
| 2022/0187677 A1* | 6/2022 | Won ....................... | G02F 1/294 |
| 2024/0061376 A1* | 2/2024 | Rho ....................... | G02B 1/002 |

FOREIGN PATENT DOCUMENTS

| | | |
|---|---|---|
| CN | 112782880 A | 5/2021 |
| JP | 2021-501363 A | 1/2021 |
| KR | 890017557 A | 12/1989 |

(Continued)

OTHER PUBLICATIONS

Korean Office Action dated Apr. 8, 2026 issued in Korean Patent Application No. 10-2022-0088993.

*Primary Examiner* — Jonathan Y Jung
(74) *Attorney, Agent, or Firm* — Morgan Lewis & Bockius LLP

(57) ABSTRACT

The present disclosure relates to a lens that can be used for a hologram, an augmented/virtual reality display, and the like, and more particularly, to a meta-lens using a meta surface.

7 Claims, 7 Drawing Sheets

100

(56)　　　　　　References Cited

FOREIGN PATENT DOCUMENTS

| KR | 10-2003-0034557 | A | 5/2003 |
| KR | 10-2019-0040681 | A | 4/2019 |
| KR | 10-2019-0077139 | A | 7/2019 |
| KR | 10-2022-0082313 | A | 6/2022 |
| WO | 2012/166971 | A1 | 12/2012 |
| WO | 2019/089124 | A1 | 5/2019 |

* cited by examiner

[Fig. 1]
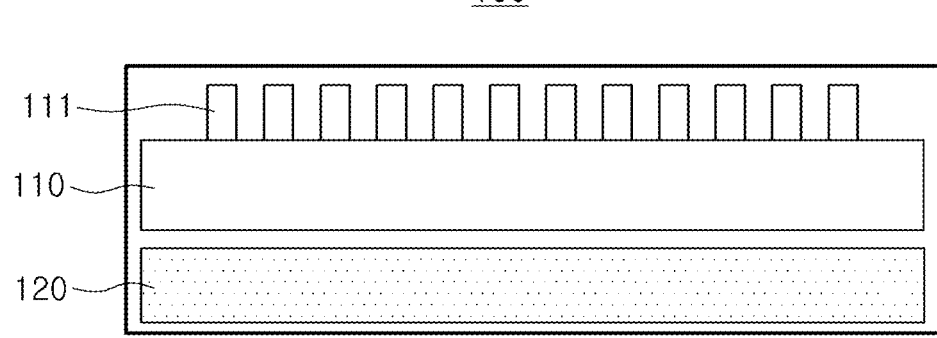

[Fig. 2]
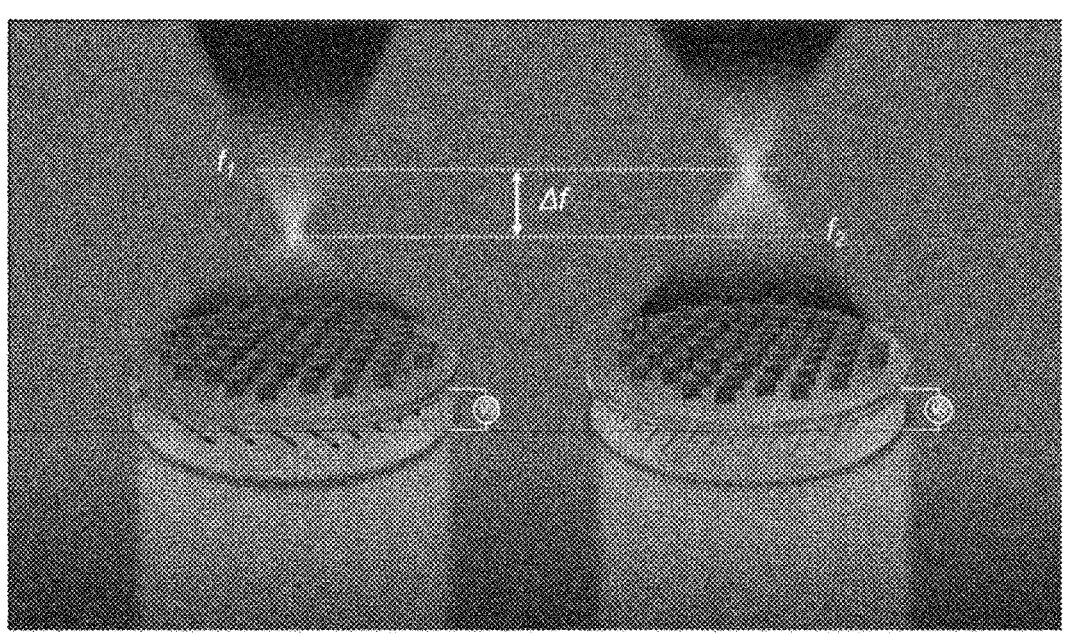

[Fig. 3]
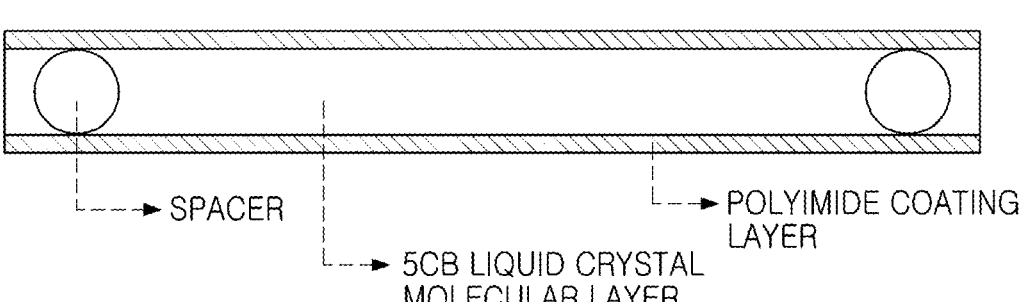
120

[Fig. 4]
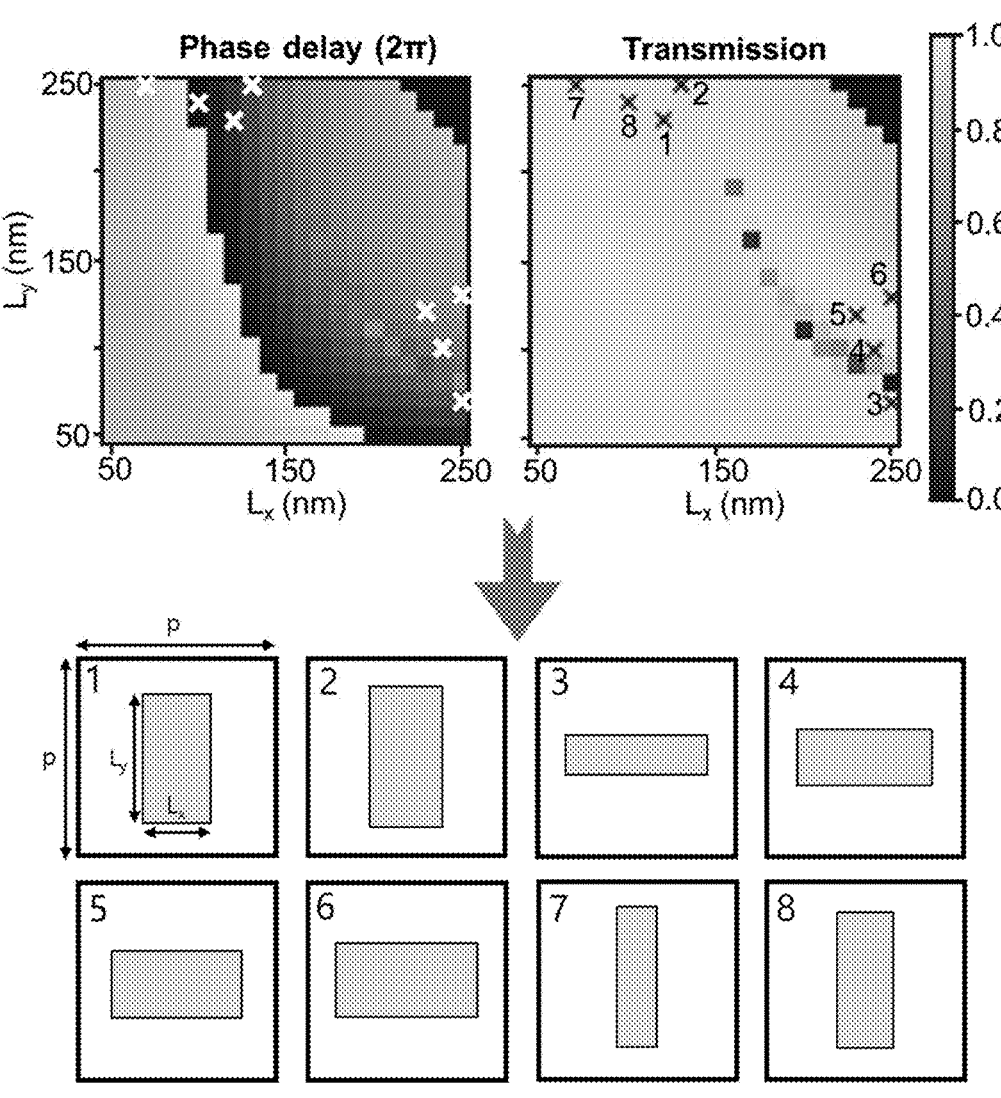

[Fig. 5]
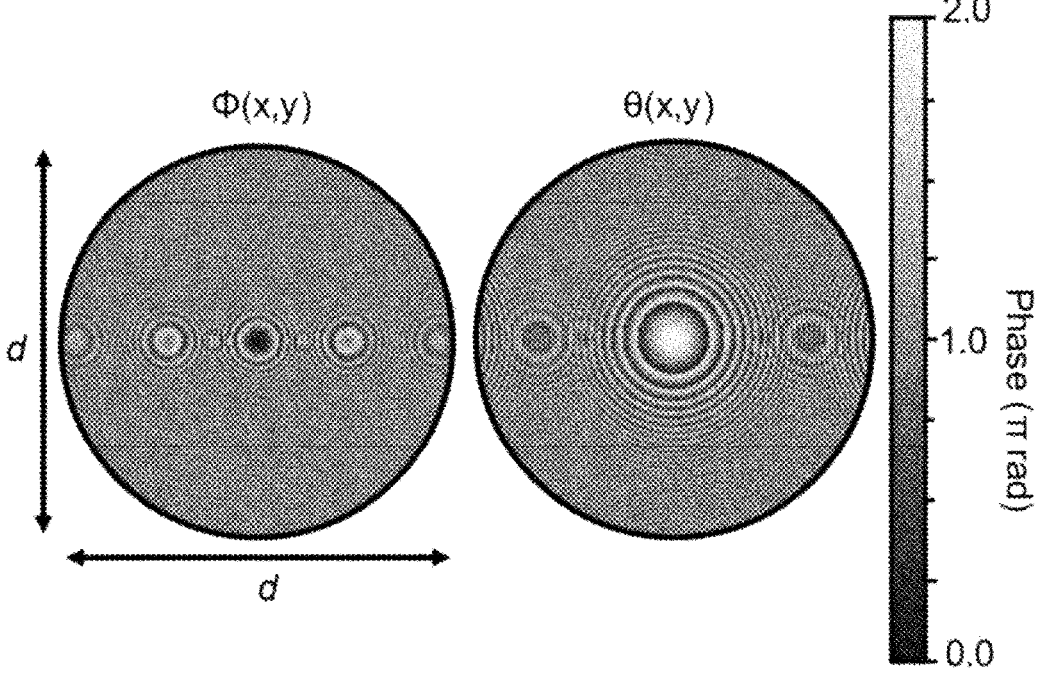

[Fig. 6]
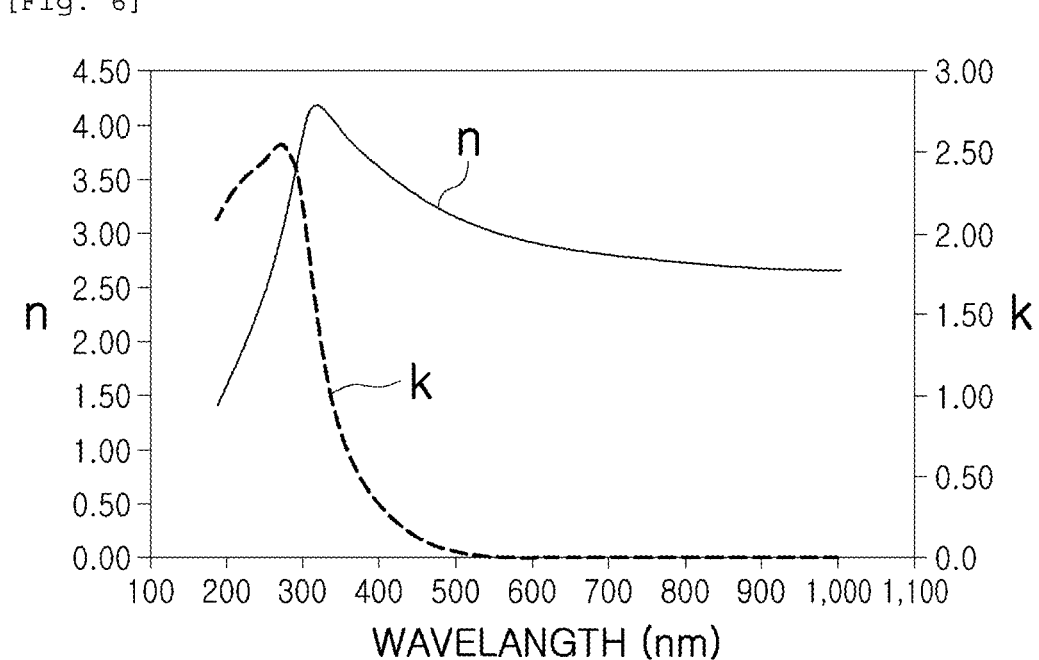

[Fig. 7]
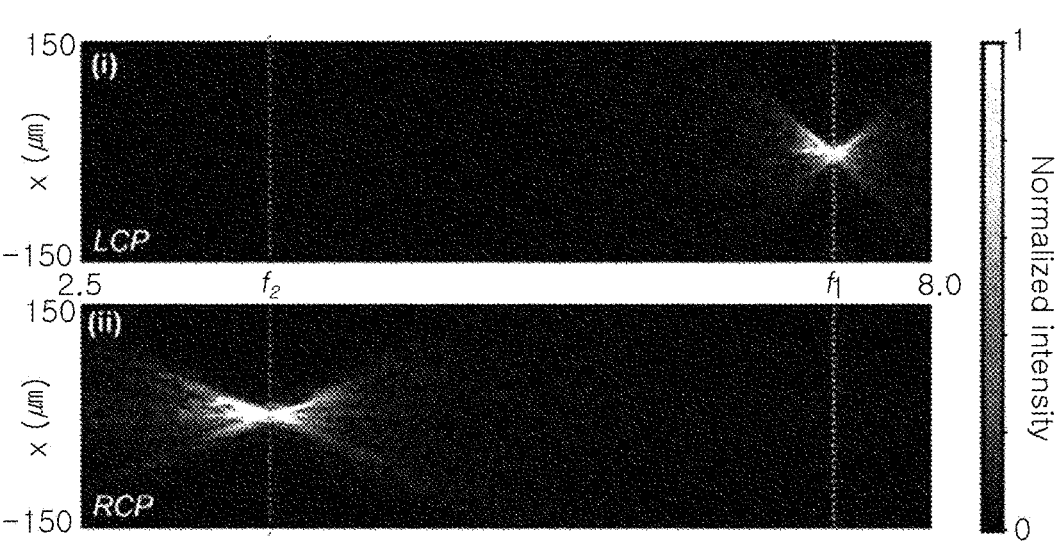

MULTI-FOCUSING META LENS

CROSS-REFERENCE TO RELATED APPLICATION(S)

This application claims the benefit under 35 USC 119(a) of Korean Patent Application No. 10-2022-0088993 filed on Jul. 19, 2022 in the Korean Intellectual Property Office, the entire disclosures of which are incorporated herein by reference for all purposes.

BACKGROUND

The present disclosure relates to a lens that can be used by a hologram, an augmented/virtual reality display, and the like, and more particularly to a meta-lens using a meta surface.

A meta surface is an ultra-thin planar optical device made by arranging nanostructures, also known as 'metaatoms,' smaller than a wavelength of incident light. Required light characteristics (amplitude, phase, polarization, and the like) can be adjusted through such nanostructures. A color filter enabling printing of a white light structural color while controlling a reflection amplitude for each pixel using such a meta-surface may be implemented, and a hologram may be implemented while adjusting a phase for each position. Meanwhile, it can also be applied to a lens adjusting a focus according to light characteristics (amplitude, phase, and the like) while passing light, known as a meta-lens.

Meanwhile, in order to implement a hologram, a virtual reality or an augmented reality display, use of a lens is essential. A lens for this purpose should be capable of implementing multifocality. A conventional lens for implementing multifocality consists of mechanically moving a bulky glass-based optical device.

However, the conventional method has limitations in that an entire system thereof is heavy and occupies a large volume.

Therefore, it has been proposed to use a light and thin meta-lens, but there were limitations in implementing multifocality. For example, when multifocality is implemented using light in a visible light wavelength range, there were limitations in that it is not easy to make the light in the visible light range has two or more multifocal points.

There is a growing interest and demand for a lightweight device capable of overcoming these limitations and implementing multifocality.

SUMMARY

An aspect of the present disclosure relates to a metal lens, and relates to a multifocus meta-lens capable of forming two or more multifocal points.

The object of the present disclosure is not limited to the above. Those skilled in the art to which the present disclosure pertains will have no difficulty in understanding the additional tasks of the present disclosure from the overall details of the specification of the present disclosure.

According to an aspect of the present disclosure, a multifocus metal lens includes: a liquid crystal layer; and a meta-lens coupled to one or both surfaces of the liquid crystal layer, wherein a nanostructure is formed on a surface of the meta-lens.

BRIEF DESCRIPTION OF DRAWINGS

The above and other aspects, features, and advantages of the present disclosure will be more clearly understood from the following detailed description, taken in conjunction with the accompanying drawings, in which:

FIG. 1 is a cross-sectional view illustrating an embodiment of a meta-lens of the present disclosure.

FIG. 2 relates to an embodiment of the meta-lens of the present disclosure, and is a schematic diagram illustrating a change in incident polarization and a corresponding change in focus according to an arrangement state of molecular structures of a liquid crystal layer.

FIG. 3 is a cross-sectional view illustrating an example of a liquid crystal layer in the present disclosure.

FIG. 4 is a schematic diagram illustrating an example of a process of selecting a nanostructure in an embodiment of the meta-lens of the present disclosure.

FIG. 5 illustrates a phase map required for an embodiment of the meta-lens of the present disclosure.

FIG. 6 is a graph illustrating a refractive index of hydrogenated amorphous silicon (a-Si:H) used as an embodiment of the meta-lens of the present disclosure.

FIG. 7 is a photograph confirming a phenomenon in which two multifocal points are formed according to a polarization state using an embodiment of the meta-lens of the present disclosure.

DETAILED DESCRIPTION

The terms used herein are intended to describe the present disclosure and are not intended to limit the present disclosure. Also, the singular forms used herein include the plural forms unless the related definition clearly dictates the contrary.

The meaning of "comprising" as used in the specification specifies a component, and does not exclude the presence or addition of other components.

Unless defined otherwise, all terms including technical terms and scientific terms used herein have the same meaning as commonly understood by a person of ordinary skill in the art to which the present disclosure belongs. The terms defined in the dictionary are interpreted to have a meaning consistent with the related technical literature and the currently disclosed content.

Hereinafter, specific embodiments of the present disclosure will be described in detail with reference to the drawings.

FIG. 1 is a schematic diagram illustrating a cross-sectional structure of a multifocus meta-lens 100 according to an embodiment of the present disclosure. The multifocus meta-lens 100 may include a liquid crystal layer 120 and a meta-lens 110 bonded to one surface of the liquid crystal layer 120, and a nanostructure 111 may be formed on a surface of the meta-lens.

The liquid crystal layer 120 and the meta-lens 110 may be one or more, and the meta-lens 110 may be bonded to both sides of the liquid crystal layer 120 as well as one surface thereof. The liquid crystal layer 120 and the meta-lens 110 are preferably disposed in parallel on a path of light, and in this case, the liquid crystal layer 120 and the meta-lens 110 may be bonded to each other through arrangement, adhesion, lamination, or the like.

The liquid crystal layer 120 is not particularly limited, and the type or form thereof is not limited as long as it can be applied to the present disclosure. FIG. 3 is a cross-sectional view illustrating an example of a liquid crystal layer. The liquid crystal layer of FIG. 3 may be made by spin-coating polyimide on a glass substrate to create an environment in which liquid crystal molecules may be unidirectionally aligned, and then assembling two plates to have a sandwich structure (maintaining a gap of 10 μm) using a spacer and UV-adhesive, and injecting 5CB (4-Cyano-4'-pentylbiphenyl) liquid crystal molecules therebetween.

In the liquid crystal layer 120, an arrangement state of liquid crystal molecules is changed according to an applied voltage, and thus a polarization state of incident light is changed. FIG. 2 illustrates an embodiment of the present disclosure, when a molecular arrangement state of the liquid crystal layer is changed according to the applied voltage, and a polarization state of light passing through the liquid crystal layer is changed and passes through the meta-lens, different focus positions $f_1$ and $f_2$ are implemented so that a difference in focus ($\Delta f$) may be confirmed.

The meta-lens 110 has a nanostructure 111 formed on a substrate. The nanostructure 111 has different structural variables (height H, width $L_x$, length $L_y$, rotation angle $\alpha$) on a plane of the substrate. The structural variables of the nanostructure 111 are determined by various factors such as a phase effect according to the polarization state of incident light, a target incident wavelength, a size and focus of a meta-lens, and the like.

FIG. 4 illustrates an example of a process of selecting a nanostructure in an embodiment of the meta-lens of the present disclosure. In this case, the nanostructure is obtained by selecting 8 nanostructures having different structural variables having a phase delay effect and satisfying excellent transmission.

The phase delay effect is determined by considering a propagation phase ($\varphi(x,y)$) and a geometric phase ($\theta(x,y)$), while FIG. 5 illustrates a phase map of the propagation phase and the geometric phase, and the nanostructure is formed by being appropriately disposed on each portion of the meta-lens considering both of the two phases.

For a detailed description of this, in order for the metal lens to operate and focus on one focal point, a phase equation should satisfy the following lens equation.

$$\Psi(x, y) = -\frac{2\pi}{\lambda}\left(f - \sqrt{x^2 + y^2 + z^2}\right)$$ (Equation 1)

$\psi(x,y)$ is a phase at a (x,y) coordinate, $\lambda$ is an operating wavelength, and f is a focal length. In this case, since it has different focal lengths depending on the type of circular polarization (left-circularly polarized (LCP), right-circularly polarized (RCP)), an f value may vary depending on the incident light, and accordingly, the required phase may also change ($\psi RCP(x,y)$ and $\psi LCP(x,y)$). As light of circular polarization passes through meta-atoms, two elements are generated: a propagation phase ($\varphi(x,y)$) and a geometric phase ($\theta(x,y)$). In this case, in order to make the light converge at different focal lengths according to circular polarization, the following equation should be satisfied.

$$\Psi_{RCP}(x,y)=\Phi(x,y)+2\theta$$ (Equation 2)

$$\Psi_{LCP}(x,y)=\Phi(x,y)+2\theta$$ (Equation 3)

If equations 2 and 3 are combined and expressed as equations for the propagation phase and the geometric phase, which is as follows.

$$\Phi(x, y) = \frac{\Psi_{RCP}(x, y) + \Psi_{LCP}(x, y)}{2}$$ (Equation 4)

$$2\theta(x, y) = \frac{\Psi_{RCP}(x, y) - \Psi_{LCP}(x, y)}{2}$$ (Equation 5)

FIG. 5 illustrates an example a phase map satisfying the phase equation, since the propagation phase may be given by changing a shape of the structure, and the geometric phase may be given by rotating the nanostructure, by giving the shape of the structure at each coordinate to satisfy the propagation phase equation and rotating the structure to satisfy the geometric phase, a meta-lens may ultimately be designed.

Meanwhile, as an example of the meta-lens 110, a nanostructure of hydrogenated amorphous silicon (a-Si:H) may be formed on a fused silica glass substrate. Since the fused silica substrate has an n value (refractive index) of about 1.46 and a k value (extinction index) close to 0 at a wavelength of 633 nm, which is a visible light region, it is suitable for making a transmissive metasurface.

As a material for the nanostructure 111, a material having a high n value to effectively refract light and a k value to minimize loss, should be used, a-Si:H, a material satisfying this requirement, was used. Using the same, a basic set was constructed by selecting 8 meta-atoms satisfying the condition that a transmittance is close to 1, and an average transmittance of the 8 meta-atoms was about 95%.

FIG. 6 illustrates a refractive index of hydrogenated amorphous silicon (a-Si:H) that can be used as a material for a meta-lens as an embodiment of the present disclosure. From FIG. 6, it can be confirmed that the a-Si:H has an n value (n=2.88) close to 3 at a wavelength of 633 nm, which is a visible light wavelength, and a low k value (k=0.00166), so that it can be confirmed that a meta-lens having high transmission efficiency may be manufactured.

Meanwhile, in the method of manufacturing the meta-lens, a nanostructure is formed on a substrate of the meta-lens, and in this case, it may be manufactured using an E-beam lithography process. As an example of a method for manufacturing the meta-lens of the present disclosure, first, an a-Si:H layer having a thickness of 500 nm is deposited by plasma enhanced chemical vapor deposition (PECVD), and then an electron beam is focused on a coated positive tone photoresist, PMMA, so that a desired shape of the structure is formed. Next, after depositing a chromium layer to be used as an etching mask, and then removing the remaining etching mask after a dry etching process, the nanostructure of the metal lens is finally completed.

FIG. 7 is a photograph as a result of observing a phenomenon in which two focal points are formed using an embodiment in which a multifocus meta-lens manufactured in the method described above. A microscope set-up was used to confirm a phenomenon in which a focal point is formed. Laser light emerging in a linearly polarized state passes through a liquid crystal layer serving as a quarter-wave plate. By connecting a function generator to the liquid crystal layer and adjusting a voltage, polarization of light incident to the meta-lens can be made into a right circular polarization (RCP) state or a left circular polarization (LCP) state.

The light formed on the focal point while passing through the metal lens was enlarged through an objective lens, and an image was captured by the camera. A microscope set-up was mounted on a stage, and a total of 195 images per polarization were stacked by setting a moving distance of the stage to 0.03 mm to obtain a final focus test result of FIG. 7. That is, FIG. 7 is a photograph as a result of observing a phenomenon in which two focal points are formed using an embodiment of the multifocus meta-lens of the present disclosure.

Looking at the results of FIG. 7, it was confirmed that two focal points appeared respectively according to the circular polarization states LCP and RCP, and it was confirmed that the focal length was about 4 mm.

As forth above, according to the present disclosure, an ultra thin lens may be provided by overcoming the limitations of an existing heavy and bulky multifocal lens system. In addition, a multifocus meta-lens capable of implementing multifocality, which was difficult to implement in a visible light region.

In particular, a lens that can change the focus in real time according to polarization through a liquid crystal, and can be applied to variable beam steering requiring fast focus conversion, hologram devices, augmented/virtual reality display technologies, and the like, since a conversion speed of the liquid crystal is fast, may be provided.

Various and beneficial advantages and effects of the present disclosure are not limited to the above description, and will be more easily understood in the process of describing specific embodiments of the present disclosure.

While the example embodiments have been illustrated and described above, it will be apparent to those skilled in the art that modifications and variations could be made without departing from the scope of the present invention as defined by the appended claims.

What is claimed is:

1. A multifocus meta-lens, comprising:
a liquid crystal layer;

a meta-lens bonded to one or both surfaces of the liquid crystal layer; and
a nanostructure bonded to a surface of the meta-lens,
wherein the meta-lens is disposed between the liquid crystal layer and the nanostructure.

2. The multifocus meta-lens of claim 1, wherein the bonding is formed by any one of arrangement, adhesion, and lamination.

3. The multifocus meta-lens of claim 1, wherein in the liquid crystal layer, an arrangement state of liquid crystal molecules is changed according to an applied voltage, so that a polarization state of light is changed.

4. The multifocus meta-lens of claim 1, wherein the nanostructure has different structural variables including a phase delay effect, and
wherein the different structural variables include height H, width Lx, length Ly, rotation angle $\alpha$.

5. The multifocus meta-lens of claim 4, wherein the phase delay effect is determined by a propagation phase ($\varphi(x, y)$) and a geometric phase ($\theta(x, y)$).

6. The multifocus meta-lens of claim 1, wherein the nanostructure is hydrogenated amorphous silicon (a-Si:H).

7. The multifocus meta-lens of claim 1, wherein the nanostructure is manufactured using an electron beam lithography (E-beam lithography) process.

* * * * *